United States Patent [19]

Dieckmann et al.

[11] Patent Number: 5,364,517
[45] Date of Patent: Nov. 15, 1994

[54] PEROVSKITE-SPINEL FCC $NO_x$ REDUCTION ADDITIVE

[75] Inventors: Gunther H. Dieckmann, Concord; Elena Q. Labrador, Richmond, both of Calif.

[73] Assignee: Chevron Research and Technology Company, San Francisco, Calif.

[21] Appl. No.: 19,732

[22] Filed: Feb. 19, 1993

[51] Int. Cl.⁵ .............................................. C10G 11/04
[52] U.S. Cl. .................... 208/121; 208/113; 502/524; 502/525
[58] Field of Search ............... 208/121, 113; 502/524, 502/525

[56] References Cited

U.S. PATENT DOCUMENTS

| | | | |
|---|---|---|---|
| 3,865,923 | 2/1975 | Stephens | 423/213.2 |
| 3,914,389 | 10/1975 | Haacke | 423/263 |
| 3,929,670 | 12/1975 | Kudo et al. | 252/455 |
| 4,055,513 | 10/1977 | Wheelock | 502/524 |
| 4,151,123 | 4/1979 | McCann, III | 252/462 |
| 4,182,694 | 1/1980 | Lauder | 252/462 |
| 4,617,175 | 10/1986 | Tolpin et al. | 422/171 |
| 4,790,982 | 12/1988 | Yoo et al. | 423/239 |
| 4,963,520 | 10/1990 | Yoo et al. | 502/64 |
| 5,037,538 | 8/1991 | Chin et al. | 208/113 |
| 5,093,301 | 3/1992 | Chu et al. | 502/303 |

FOREIGN PATENT DOCUMENTS

PCT/US87/-
00750 4/1987 WIPO .

*Primary Examiner*—Paul Lieberman
*Assistant Examiner*—Lorna M. Douyon
*Attorney, Agent, or Firm*—Alan W. Klaassen; Vince J. Cavalieri

[57] ABSTRACT

The NOx content of FCC regenerator flue gas is reduced using a spinel/perovskite additive which maintains activity during FCC operation in the presence of high levels of sulfur oxides and oxygen. Additionally, a stabilization component may be added to enhance catalytic stability of the additive, and a cracking component may be added under conditions of low reducing agents in the regenerator flue gas.

30 Claims, No Drawings

PEROVSKITE-SPINEL FCC NO$_x$ REDUCTION ADDITIVE

BACKGROUND OF THE INVENTION

The present invention relates to a method for controlling nitrogen oxides levels in flue gases generated in refinery processing, and specifically in fluid catalytic cracking systems. More particularly, the present invention provides a process for reducing the NOx content of FCC regenerator flue gas in the presence of sulfur oxides by contacting the flue gas with an additive comprising a perovskite, a spinel, and optionally a stabilization component and a cracking component.

NOx Reduction in FCC Regenerators

Modern hydrocarbon catalytic cracking systems use a moving bed or fluidized bed of a particulate catalyst. Catalytic cracking differs from hydrocracking in that it is carried out in the absence of externally supplied molecular hydrogen. The cracking catalyst is subjected to a continuous cyclic cracking reaction and catalyst regeneration procedure. In a fluidized catalytic cracking (FCC) system, a stream of hydrocarbon feed is contacted with fluidized catalyst particles in a hydrocarbon cracking zone, or reactor, usually at a temperature of about 425° to 600° C. The reactions of hydrocarbons in the hydrocarbon stream at this temperature result in deposition of carbonaceous coke on the catalyst particles. The resulting fluid cracked hydrocarbons and other vapors are separated from the coked catalyst and are withdrawn from the cracking zone. The coked catalyst is stripped of volatiles and cycled to a catalyst regeneration zone. In the catalyst regenerator, the coked catalyst, which usually contains a minor amount of sulfur and nitrogen from the hydrocarbon feed in addition to the carbonaceous coke, is contacted with a gas, such as air, which contains a predetermined concentration of molecular oxygen to burn off a desired portion of the coke from the catalyst and simultaneously to heat the catalyst to the high temperature required for contacting the catalyst with the hydrocarbon stream in the cracking zone. After regeneration, the catalyst is cycled to the cracking zone, where it is used to vaporize the hydrocarbons and to catalyze hydrocarbon cracking. The flue gas formed by combustion of coke in the catalyst regenerator contains steam, oxygen, carbon monoxide, carbon dioxide, and nitrogen. Varying amounts of sulfur oxides and nitrogen oxides may also be present. The flue gas is removed from the regenerator, and may be treated to remove particulates and carbon monoxide from it, after which it is normally passed into the atmosphere. Concerns with control of pollutants in flue gas have resulted in a search for improved methods for controlling such pollutants. In the past, concern has centered on sulfur oxides and carbon monoxide. Nitrogen oxides have more recently become a problem, at least partly because of the use of combustion promoters to burn carbon monoxide.

In fluidized bed catalytic cracking (FCC), the spent catalyst is reactivated by burning the coke in air. During reactivation (or regeneration) nitrogen oxides, including nitric oxide (NO) and nitrogen dioxide (NO$_2$) are produced. In the present specification, NOx will be used herein to represent nitric oxide, and nitrogen dioxide, as well as mixtures containing these gases. NOx from the FCC catalyst regeneration process become part of the regenerator flue gas. Typical flue gas NOx concentrations range from about 10 ppmv to about 5000 ppmv and more commonly from about 50 ppmv to about 500 ppmv. Because NOx is an important contributor to general air pollution problems, refineries may treat their FCC flue gas to reduce their overall NOx emissions. U.S. Pat. No. 3,900,554 describes a homogeneous gas phase reduction of NOx with ammonia at a temperature range of 870° to 1100° C. To treat FCC flue gas at these temperatures, the flue gas leaving the regenerator is first mixed with ammonia and then passed through a CO boiler where temperatures are high enough to allow the gas phase reduction to occur. Typical NOx reductions are on the order of 40 to 70% with this technology. However if the FCC unit does not have a CO boiler or if stricter air quality standards are imposed, alternate technologies need to be considered. U.S. Pat. No. 3,279,884 describes selective catalytic reduction where NOx is reduced by ammonia over vanadium oxide, molybdenum oxide, or tungsten oxide at a temperature range of 150° C. to 400° C. While the "selective catalytic reduction" system is capable of reducing NOx to low levels, it is also more expensive to build and operate.

An alternative solution, which eliminates the need for a costly selective catalytic reduction system, entails the use of a NOx reducing additive added to the catalyst inventory. Several metals-containing catalysts, including the zinc-containing catalyst of U.S. Pat. No. 5,002,654 and the antimony-containing catalyst of U.S. Pat. No. 4,988,432 when added to the FCC cracking catalyst, have been proposed for reducing the NOx content in catalytic cracking regenerator flue gas. U.S. Pat. No. 4,988,432 is directed to reducing the CO and NOx content of regenerator flue gas in the catalytic cracking of a heavy hydrocarbon feed containing nickel and nitrogen compounds by adding to the inventory of circulating particulate solids a CO combustion promoter and a separate particulate additive containing antimony to reduce the production of NOx. Rare earth metals have also been found to be useful for reducing the NOx content of gaseous streams. For example, U.S. Pat. No. 3,865,923 teaches a process using a copper/rare earth/manganese oxide having a perovskite type crystal structure for reducing the hydrocarbon, carbon monoxide and nitrogen oxide content of engine exhaust gas. U.S. Pat. No. 3,914,389 describes a process for preparing a lanthanum copper manganese oxide compound which is taught as having oxidation activity and thermal stability for use as an auto exhaust oxidation catalyst. U.S. Pat. No. 3,929,670 describes a catalyst consisting essentially of lanthanum, a lanthanide, copper, and an element selected from lithium, aluminum, titanium, vanadium, chromium, manganese, iron, cobalt, nickel, zinc, gallium, zirconium, tin, molybdenum, and tungsten.

Zeolites have been disclosed as NOx reduction catalysts for furnace flue gas application in U.S. Pat. No. 4,798,513 and U.S. Pat. No. 4,973,399. U.S. Pat. No. 4,798,813 describes a titania/zeolite catalyst with the zeolite having 0.01-20 % by weight copper supported thereon for the reduction of nitrogen oxides in oxidation furnace flue gas. This patent is directed to the problem of catalyst poisons such as arsenic, selenium, and tellurium, which are taught to be partially excluded from the catalytic copper by the small zeolite pores in which some of the copper is located. U.S. Pat. No. 4,973,399 teaches using a zeolite having a pore size greater than 5

Angstroms and containing rare earth metal compounds and 0.25 moles CuO per mole of zeolitic alumina supported in a titania or zirconia matrix. U.S. Pat. No. 5,085,762 discloses a process for reducing NOx and carbon monoxide emissions from a catalytic cracking process using copper-containing additive particles of a crystalline zeolite labeled "MCM-22".

U.S. Pat. No. 4,963,520 discloses a metal-containing spinel composition containing a sulfur oxidation promoter and a metal promoter for reducing a metal sulfate. U.S. Pat. No. 4,790,982 discloses a process for using the composition of '520 for reducing the SOx and/or the NOx content of a gas. The spinel of '520 and '982 include a first metal and a second metal having a valence higher than that of the first metal. Group IB metals, Group IIB metal, Group VIA metal, the rare earth metals, the platinum group metals and mixtures thereof are taught as being effective as the sulfur oxidation promoters. The metals iron, nickel, titanium, chromium, manganese, cobalt, germanium, tin, bismuth, molybdenum, antimony, and vanadium are disclosed as effective promoters for the reduction of the first metal sulfate.

The problem of NOx reduction catalyst stability in FCC service is partially addressed in U.S. Pat. No. 5,037,538, which teaches a process for reducing the NOx content of regenerator flue gas using a NOx reduction catalyst which has an extended residence time in the fluidized catalytic cracker regenerator relative to the residence time of the FCC cracking catalyst.

However, none of the art cited above adequately addresses the problem of the stability and activity of the NOx reduction catalyst in fluid catalytic cracking operations. In order to be effective in commercial operation, the NOx reduction catalyst must maintain activity while being subjected to repeated redox cycles in the severe hydrothermal environment of the FCC reactor unit and the FCC regenerator unit. Furthermore, in conventional NOx reduction processes for FCC regenerator flue gas, sulfur oxides and excess oxygen significantly reduce catalyst effectiveness, and an insufficient amount of a reducing agent reduces NOx reduction rates. The process and additive of the present invention overcome these deficiencies.

SUMMARY OF THE INVENTION

The essençe of the present invention resides in the discovery of an additive which, when used at FCC regenerator conditions, reduces the NOx content of FCC flue gas while maintaining high activity and stability. Furthermore, the additive maintains high activity and stability in the presence of a flue gas Containing high levels of sulfur oxides and oxygen, and low levels of a reducing agent. In accordance with the present invention, a process is provided for reducing the NOx content of FCC regenerator flue gas comprising contacting said flue gas at FCC regenerator conditions with an NOx reducing effective amount of an NOx reducing additive comprising a perovskite containing at least one transition metal; a spinel containing at least one Group IIA element and at least one Group IIIA element; and at most about 10 weight percent of a stabilization component comprising an element or compound thereof selected from the group consisting of copper, zinc and mixtures thereof. The additive may also contain a cracking component. A catalytic material known to form carbonaceous coke at the conditions of the FCC reactor may be included as the cracking component in the additive.

In another embodiment, a process is provided for reducing the NOx content of sulfur-containing FCC regenerator flue gas, said process comprising cracking hydrocarbons in the absence of externally supplied molecular hydrogen in a cracking system employing an inventory of circulating particulate solids including cracking catalyst particles, said inventory being cycled between a cracking zone and a catalyst regeneration zone, wherein said hydrocarbons are cracked in contact with said catalyst particles and coke is formed on said catalyst particles at cracking conditions in said cracking zone, and flue gas is formed by burning said coke off said catalyst particles with oxygen or a molecular oxygen-containing gas at regeneration conditions in said regeneration zone, and said flue gas is vented from said regeneration zone, wherein said process comprises adding to said inventory of circulating particulate solids an NOx reducing effective amount of an additive comprising a perovskite containing a transition metal, a spinel containing at least one Group IIA element and at least one Group IIIA element; and at most about 10 weight percent of a stabilization component comprising an element or compound thereof selected from the group consisting of copper, zinc and mixtures thereof.

Further to the invention, an NOx reduction additive is provided, said additive comprising a perovskite containing at least one transition metal; a spinel containing at least one Group IIA element and at least one Group IIIA element; and at most about 10 weight percent of a stabilization component comprising an element or compound thereof selected from the group consisting of copper, zinc and mixtures thereof. In a separate embodiment, the additive may optionally contain a cracking component.

Among other factors, the present invention is based on the discovery of a NOx reduction additive which maintains high activity in severe NOx reduction service, such as, for example, in an FCC. In contrast to conventional additives for NOx control, the present additive maintains high activity during repeated redox cycling in the FCC reactor and the FCC regenerator. The additive also maintains high activity in the presence of sulfur oxides, in the presence of excess oxygen, and in an environment of low levels of a reducing agent.

The full scope of the present invention will be apparent to those familiar with reducing the NOx content of combustion flue gas from the following detailed description of the principle features of the invention and from the examples which accompany the description.

DETAILED DESCRIPTION OF THE INVENTION

As used herein, "activity" is a measure of the ability of the additive to remove NOx from the flue gas. As the activity of the additive increases, the NOx content of the flue gas decreases, at constant regenerator conditions. As used herein, "stability" is a measure of the ability of the additive to maintain constant activity over time when used in the present process.

PEROVSKITE

As noted above, one of the critical constituents of the present NOx reduction additive is a perovskite containing at least one transition element selected from Groups VIB, VIIB, VIII, IB, and IIB of the Periodic Table. Preferably, the transition metal component is selected from the group consisting of chromium, manganese, iron, cobalt, nickel, copper, and zinc.

The perovskite may also comprise at least one component selected from the group consisting of Group IA, Group IIA, and Group IIIB elements, wherein the Group IIIB elements are more preferred. Included in the Group IIIB elements are the rare earth elements, having atomic numbers from 57 to 71 inclusive. In the most preferred embodiment, the perovskite component has the general formula $LnCu_xMN_{1-x}O_3$, where "Ln" is a rare earth element or mixture of rare earth elements, and where x has a value of at most about 0.6.

The notation used herein to represent elements (i.e. Groups IA, IIA, and IIIB) is taken from the PERIODIC TABLE OF THE ELEMENTS located in the inside front cover of R. H. Perry and C. H. Chilton, *Chemical Engineers' Handbook*, Fifth Edition, McGraw-Hill Book Company, 1973.

The perovskite can be synthesized by a variety of routes, including heating finely ground intimate mixtures of active sources of the perovskite at a temperature in the range from about 500° to 1300° C., and more preferably in the range of from about 600° C. to about 900° C. Typical active sources of the perovskite includes carbonates, hydroxides, nitrates, oxalates, and/or oxides of the transition metals and of the Groups IA, IIA, and IIIB elements. When perovskites are prepared using a mixture of rare earth elements and this rare earth mixture contains cerium, the stoichiometry of the composition may require adjustment to account for reactions between cerium and other rare earth elements forming oxides which have non-perovskite structures.

Additionally, the stoichiometry of the active sources are preferably controlled during preparation of the perovskite so that most, if not all, of the transition metal element is consumed during the reaction forming the perovskite. Otherwise the excess transition metal may act to dramatically decrease the life of the additive. Thus, it is preferred that the active sources of the perovskite be combined such that the perovskite contains a Group IA, IIA, and/or IIIB combination to transition metal atomic ratio equal to or greater than about one (1).

As used herein, the term "perovskite" represents a metal oxide having either an ideal or "defect" perovskite-type crystal structure. The crystal structure of an ideal perovskite is cubic, but frequently crystallographic distortions can greatly reduce the symmetry. Ideal perovskites have the empirical formula, $ABO_3$, where the A cation occupies a cubic close packed site (thus is coordinated to 12 oxygen atoms), while the B cation occupies an octahedral hole in the close packed structure.

In many perovskite-type compounds (also referred to as "defect perovskites") the sum of the valences of the A and B cations may be less than 6. The net result is that the oxygen-sublattice contains a large number of vacancies or defects, which may or may not be ordered. If the oxygen vacancies are ordered, the crystal structure as well as the stoichiometry can be dramatically altered from that of the ideal perovskite. See, for example, M. A. Beno, et. al., *Appl. Phys. Lett.* 51, 57, 1987. Defect oxide forms of perovskites, alone or in combination with defect oxide spinels, have been disclosed as NOx reduction catalysts in U.S. Pat. No. 5,093,301.

The following references provide additional details on the composition and structure of perovskites: U.S. Pat. No. 5,110,782, issued May 5, 1992 to H. Hirono, et.al.; C. Palache, et al., "The System of Mineralogy: Seventh Edition", Vol. I, John Wiley & Sons, Inc., 1944, p. 730f; W. W. Porterfield, "Inorganic Chemistry", Addison-Wesley Publishing Company, 1984, p, 109,110.

The NOx reduction additive also comprises a spinel containing at least one Group IIA element and at least one Group IIIA element. The preferred Group IIA element is magnesium and the preferred Group IIIA element is aluminum. It is more preferred that the atomic ratio of the Group IIA element(s) to the Group IIIA element(s) in the NOx reduction additive be in the range from about 0.25 to about 2.5.

The spinel component of the present process may be prepared from active sources of Group IIA and Group IIIA elements, using methods known to the art, for example, in U.S. Pat. No. 4,904,627, the disclosure of which is included herein by reference. However, reasonable care must be taken to prevent damage to one of the components of the additive during preparation of another component of the solid. For example, one skilled in the art of perovskite materials and of zeolitic cracking catalysts will appreciate the detrimental result of contacting these materials with solutions having a low, i.e. acidic, pH. Thus, during the preparation of the additive, it is important to avoid a condition in which the pH is sufficiently low to adversely affect the structural integrity of the perovskite component or optionally the cracking component. Accordingly, it is preferred that the pH of the reaction mixture used in preparing the spinel component in the presence of the perovskite component be at least 3.5, and preferably at least 4.0.

It is also preferred that the spinel and the perovskite be intimately mixed in the additive particle. This can be achieved in a number of ways. Non-limiting examples include, forming either a slurry or a gel mixture containing a spinel and/or spinel precursor and a perovskite and/or perovskite precursor. The cracking component may also be added. The slurry or gel may be dried and calcined before use. The method of drying the slurry or gel is not critical, and may include either drying in a static bed or by spray drying. These methods are well known in the art. The calcining step involves heating the dried gel in air at a temperature between about 500° C. and about 900° C., and preferably between about 600° C. and about 750° C. The solids prepared in this manner may be added to the inventory of circulating particulate solids of the FCC.

The term "spinel" refers in general to a class of mixed metal oxides having a common crystallographic structure. The spinel structure is a cubic close-packed array of oxide ions having cations occupying ⅛th of the tetrahedral sites and ½ of the octahedral sites in the array. Typically, the crystallographic unit cell of the spinel structure contains 32 oxygen atoms. The structure can be symbolized by $D[E_2]O_4$, in which the E ions (enclosed in brackets) are in octahedral coordination. In the naturally-occurring magnesia alumina spinel ($MgAl_2O_4$), $Mg^{2+}$ ions occupy the tetrahedral sites and $Al^{3+}$ the octahedral sites. Many other mixed metal oxides are known to assume the spinel structure or a variation of it. One variation is the inverse spinel structure, having a structure symbolized by $E[DE]O_4$, in which the D cations are in octahedral sites, half the E cations are also in octahedral sites and half in tetrahedral sites. The following references provide additional details on the composition and structure of spinels: U.S.

Pat. No. 5,108,979, C. S Hurlbut, "Dana's Manual of Mineralogy", John Wiley & Sons, Inc., 1971, p. 292-5; W. W. Porterfield, "Inorganic Chemistry", Addison-Wesley Publishing Company, 1984, p, 109,110; and F. A. Cotton and G. Wilkinson, "Advanced Inorganic Chemistry Fifth Edition", John Wiley & Sons, 1988, p. 9.

STABILIZATION COMPONENT

To improve long term reaction stability of the additive, a stabilization component comprising an element or compound thereof selected from the group consisting of copper, zinc and mixtures thereof may be included with the additive. The stabilization component is a distinct component of the additive, preferably in intimate mixture with the spinel and the perovskite.

CRACKING COMPONENT

The NOx reduction additive particle may also optionally include, in addition to the spinel and perovskite components and any stabilization components, at least one cracking component. Catalytic materials known to have cracking activity at the conditions of the FCC reactor are suitable as cracking components in the present process.

ADDITIVE

The additive of the present process comprises from about 1 to about 40 weight percent, preferably from about 5 to about 35 weight percent, more preferably from about 10 and about 30 weight percent of the perovskite; at most about 10 weight percent, preferably between about 0.1 to about 5 weight percent, more preferably from about 0.5 to about 5 weight percent of the stabilization component; and the spinel to make 100 weight percent.

The composition of the additive, as described herein, is stated in terms of weight percent of the additive, wherein weight percent of a component is equal to 100 times the weight of the component/weight of the calcined additive. The stabilization component weight percent is given on a stabilization metal basis.

NOX REDUCTION IN THE FCC PROCESS

In order to fully appreciate the basis for limiting the present invention to embodiments depending from the features of the invention, it is useful to identify features of the NOx reduction additive which are thought to contribute to the NOx reduction properties of the additive. Although a description is helpful to explain the mechanism which is believed to be involved in the present invention, it is theoretical and is offered only to assist in understanding the scope of the present invention and the advantageous results which can be achieved by the present invention. Therefore, it is not intended that the present invention should be limited by the theory of its operation, but rather by the resulting features.

It is advantageous to put the process of this invention in the context of the overall FCC process. The fluid catalytic cracking (FCC) process is well known, and is described, for example, in Kirk-Othmer: *Encyclopedia of Chemical Technology*, Vol 17, John Wiley & Sons: New York, 3rd Edition, 1982, p.206f. U.S. Pat. Nos. 4,309,309; 5,002,653 and 5,098,554, the disclosures of which are incorporated herein by reference, also describe the FCC process, including FCC regenerator conditions. The present process for reducing the NOx content of FCC regenerator flue gas comprises cracking hydrocarbons in the absence of externally supplied molecular hydrogen in a cracking system employing an inventory of circulating particulate solids, including cracking catalyst particles. The cracking catalyst particles which may be used are well known in the art. In general, they are molecular sieves having cracking activity dispersed in a matrix.

Illustrative examples include aluminosilicate zeolites, such as zeolite Y, rare earth exchanged zeolite Y, ultrastable zeolite Y, calcium-exchanged zeolite Y; medium pore zeolites such as ZSM-5; medium pore and large pore silicoaluminophosphates; and amorphous materials such as acid exchanged clay, and amorphous aluminosilicate.

The inventory of circulating particulate solids is cycled between a cracking zone and a catalyst regeneration zone. Hydrocarbons are contacted with cracking catalyst particles in the cracking zone. A suitable weight ratio of catalyst to total oil charge is about 4:1 to about 25:1, preferably about 6:1 to about 10:1. The fresh hydrocarbon feed is generally preheated to a temperature of about 600° F. to about 700° F., but is generally not vaporized during preheat and the additional heat required to achieve the desired reactor temperature is imparted by hot, regenerated catalyst.

The reaction temperature in the reaction zone is at least about 900° F. The upper limit can be about 1100° F. or more. The preferred temperature range is about 950° F. to about 1050° F. The reaction total pressure can vary widely and can be, for example, about 5 to about 50 psig, or preferably, about 20 to about 30 psig. The maximum residence time is about 5 seconds, and for most charge stocks the residence time will be about 0.5 to about 2.5 seconds or less. The length to diameter ratio of the reactor can vary widely, but the reactor should be elongated to provide a high linear velocity, such as about 25 to about 75 feet per second; and to this end a length to diameter ratio above about 20 to about 25 is suitable. The reactor can have a uniform diameter or can be provided with a continuous taper or a stepwise increase in diameter along the reaction path to maintain a nearly constant velocity along the flow path. The amount of diluent can vary depending upon the ratio of hydrocarbon to diluent desired for control purposes. If steam is the diluent employed, a typical amount to be charged can be 1-10 percent by weight, based on hydrocarbon charge. A suitable but non-limiting proportion of diluent gas, such as steam or nitrogen, to fresh hydrocarbon feed can be about 0.5 to about 10 percent by weight.

Coke is formed on said catalyst particles at cracking conditions in said cracking zone, and flue gas is formed by burning coke off said catalyst particles which a regeneration gas or gas mixture at regeneration conditions in a regeneration zone, and said flue gas is vented from said regeneration zone. The regeneration gas or gas mixture employed must have an appropriate free oxygen (molecular oxygen) content. Normally, air is quite suitable for use in supplying free oxygen, but use of air is not essential. For example, pure oxygen or oxygen-enriched air can also be used, if desired. Conventional gases used in commercial FCC operations, such as free nitrogen (molecular nitrogen), carbon dioxide, steam, and the like, are suitable for use as fluidizing and entrainment gases.

In general, regeneration conditions employed include a combination of temperature and pressure sufficient to permit the specified degree of coke combustion, carbon monoxide combustion and nitrogen oxides reduction to take place, in the manner discussed herein. Temperatures of 1000° F. to 1500° F. (540° C. to 815° C.) are normally quite suitable. Temperatures of 1100° F. to 1350° F. (590° C. to 730° C.) are preferred. The rates of flow of regeneration gas, entrainment gases and catalyst particles through the system are maintained at levels which provide a dense-phase fluidized bed of catalyst. Fluid bed operation can be accomplished in a conventional manner by maintaining upward superficial gas velocities appropriate to the size and density of catalyst particles undergoing regeneration and by maintaining catalyst introduction and withdrawal rates at proper levels. The operating pressure is usually not particularly critical. Pressures of 1–10 atmospheres are generally quite suitable. Pressures of 2–5 atmospheres are preferred.

The NOx additive may be combined uniformly with all of the particles in the inventory of circulating particulate solids in the present FCC process. Alternatively, the inventory of circulating particulate solids in the present FCC process may comprise particulate cracking catalyst and the present NOx reduction additive, each as separate particles. The NOx reduction additive is added to the inventory of circulating particulate solids in an NOx reducing effective amount; that is, in an amount which is effective for reducing the NOx content in the regenerator flue gas below that which would be present in the absence of the additive. Preferably, the inventory of circulating particulate solids contains from about 0.001 to about 10 percent by weight, and more preferably from about 0.01 to about 5 percent by weight, and most preferably from about 0.05 to about 1 percent by weight of the NOx reduction additive.

When present as a separate particle, the NOx reduction additive particle may optionally include, in addition to the spinel, perovskite and stabilization components disclosed hereinbefore, at least one cracking component. In this embodiment it is generally preferred that the additive contain at most about 40 weight percent of at least one cracking component. It is more preferred that the additive contain at most about 25 weight percent, and even more preferred that the additive contain from about 1 to about 25 weight percent of at least one cracking component. Greater levels of the cracking component may be preferred when the flue gas contains a low carbon monoxide concentration. Catalytic materials known to have cracking activity at the conditions of the FCC reactor are suitable as cracking components in the present process. Also suitable are catalytic materials which form a surface coke layer while passing through the FCC reactor zone in the presence of hydrocarbon reactants. These include, for example, zeolite Y, rare earth exchanged zeolite Y, ultrastable zeolite Y, calcium-exchanged zeolite Y, ZSM-5, acid exchanged clay, and amorphous aluminosilicate. In preparing the additive containing the cracking component, it is preferred that the cracking component be added to the gel containing the spinel precursor, or to the gel solid containing spinel precursors and perovskite precursors, prior to drying and calcining to form the additive.

The additive, which may include the cracking component, is added to the inventory of circulating particulate solids in an NOx reducing effective amount. In most cases, from about 0.001 to about 10 weight percent of the additive will be present, where the amount of the additive in the inventory is computed on a cracking component free basis, i.e., from the sum of the weights of spinel, perovskite, and stabilization components, if any, in the additive, excluding the weight of the cracking component. It is more preferred that the inventory contain from about 0.01 to about 5 weight percent, and still more preferred from about 0.05 to about 1.0 weight percent of the NOx reduction additive, on a cracking component free basis.

The additive may be in any form suitable for circulation in the circulating particulate solids inventory in the cracking system. A major amount by weight of the additive will typically have a diameter in the range from about 10 microns to about 250 microns, and preferably in the range from about 60 microns to about 120 microns. The surface area of the additive is typically in the range from about 25 $m^2/gm$ to about 600 $m^2/gm$.

While the NOx reduction additive of the present invention is active for reducing the NOx content of FCC regenerator flue gas, it has a negligible effect on the hydrocarbon cracking reactions which occur during the FCC process. Furthermore, the additive is compatible with CO oxidation promoters which may be part of the inventory of circulating particulate solids.

Reduction of NOx in the FCC regenerator proceeds via a reaction pathway involving reaction between a reducing agent and the NOx generated during combustion of nitrogen-containing carbonaceous material on coked FCC catalyst. One reducing agent useful in the present process is carbon monoxide, which may be generated during combustion of the carbonaceous material. It is important for the present process that at least one mole of carbon monoxide be available at the point of reaction of the NOx for each mole of NOx to be reduced. Since the NOx reduction reaction is enhanced by additional carbon monoxide, CO/NOx molar ratios in the flue gas of greater than 2/1 are preferred. As NOx reduction activity is enhanced by excess CO, CO/NOx molar ratios of 500/1 or greater are also within the scope of the present invention.

Carbon monoxide concentrations in the region of the additive are affected by a number of factors, including excess oxygen in the flue gas, availability and amount of CO oxidation promoters in the FCC catalyst inventory, temperature of the regenerator, the quality of catalyst mixing in the regenerator catalyst bed and the amount of oxidation gas bypass through the bed. Under conditions of low flue gas CO concentrations, increasing the amount of cracking component in the NOx reduction additive provides additional carbon monoxide which is available for NOx reduction without significantly increasing the overall carbon monoxide produced in the FCC regenerator. Thus, the present invention is efficient for reducing NOx in flue gas to very low levels, as low as 5 ppmv. Typical flue gas NOx concentrations are less than about 5000 ppmv and more commonly range from about 50 ppmv to about 500 ppmv.

There is available to the refiner a number of known methods for controlling the carbon monoxide content of the flue gas at the desired level, including, for example, by maintaining an amount of an oxidation promoter in the FCC catalyst inventory. Platinum group metals, including platinum, palladium, ruthenium, rhodium, iridium, and osmium, are routinely used for this purpose. The amount of oxidation promoter to be added for carbon monoxide combustion in the regenerator in the practice of this invention depends on many factors, including regenerator temperature, type of feed to the FCC reactor, and the configuration of the regenerator. In general, increased amounts of oxidation promoter decrease the amount of carbon monoxide and increase the amount of NOx in the regenerator flue gas. When platinum group metals are used as carbon monoxide oxidation promoters in the practice of this invention, the amount of platinum group metal promoter may be as high as 10 ppm, based on the total weight of FCC catalyst inventory. For optimum NOx control, it is preferred that the amount of platinum group metal promoter be maintained at or below 1 ppm.

Likewise, increasing the amount of oxygen exiting with the FCC regenerator flue gas tends to decrease the amount of carbon monoxide available for reaction with the NOx on the additive. Excess oxygen also tends to increase the production of NOx in the regenerator flue gas. It is therefore preferred that the oxygen content of the FCC regenerator flue gas leaving the regenerator be less than 5%, and preferably less than 4% on a volume or molar basis.

As discussed above, the NOx reduction additive is stable in the presence of high sulfur oxide concentrations in the flue gas. Typical sulfur oxide concentrations range from about 50 ppmv to about 5000 ppmv, though generally they range from about 100 ppmv to about 1000 ppmv.

One skilled in the art of FCC processes will recognize that while in the present process the NOx reduction additive reduces the NOx content of the FCC regenerator flue gas in the inventory of circulating particulate solids within the regenerator, the composition of the flue gas is generally determined at some location remote from the inventory of circulating particulate solids, typically in a flue gas transfer line or at a flue gas exhaust port external to the regenerator. It will also be apparent to one skilled in the art that the method selected for determining the flue gas composition is not critical to the present invention. NOx content may be determined, for example, using the wet chemical techniques and spectroscopic methods described in 40 CFR Ch. 1 (Jul. 1, 1991 Edition) Pt. 60, App. A. Method 7.

These and other specific applications of the process are illustrated by the following examples.

EXAMPLES

Example 1

NOx reduction additives of this invention were prepared as follows:

Preparation of Additive 1:

A spinel support was prepared by dissolving 200 grams of magnesium nitrate hexahydrate and 585 grams of aluminum nitrate nonahydrate in 1000 ml water, and then adding this solution to 750 ml of concentrated ammonium hydroxide solution in 1500 ml water. The precipitate was then filtered, washed, dried, and calcined at 700° C. for 1 hr. The calcined product was then ground and screened down to the 45 to 150 μm range. The spinel had a surface area of 128 m$^2$/gm and a pore volume of 0.299 cc/gm.

16% LaCu$_{0.4}$Mn$_{0.6}$O$_3$ on spinel was prepared by impregnating the spinel support with the appropriate quantities of the corresponding metal salts, and then calcining the material at 950° C. for 30 min.

Preparation of Additive 2:

LaCu$_{0.4}$Mn$_{0.6}$O$_3$ was prepared in bulk by ball-milling the appropriate quantities of lanthanum oxide, manganese carbonate, and copper (II) oxide followed by a calcination at 1100° C. for 10 hours. The resulting black perovskite powder was then ball milled.

4.0 grams of the finely ground LaCu$_{0.4}$Mn$_{0.6}$O$_3$ powder was then suspended in a solution of 45 grams magnesium nitrate hexahydrate and 132 grams aluminum nitrate nonahydrate dissolved in 225 ml of water. This slurry was then added to 170 ml of concentrated ammonium hydroxide in 340 ml of water. The resulting precipitate/perovskite mixture was then filtered, washed to remove the excess NH$_3$ and NH$_4$NO$_3$, dried overnight at 100° C., calcined at 450° C. for 1 hr and then at 700° C. for 1 hr. The resulting 16% LaCu$_{0.4}$Mn$_{0.6}$O$_3$ in spinel additive was then ground and screened, and the particles in the 40 to 150 μm range were recovered for testing.

Preparation of Additive 3:

LnCu$_{0.4}$Mn$_{0.6}$O$_3$ (where Ln is a rare earth mixture containing mainly La, Pr, and Nd and possibly Ce) was prepared by ball milling 26.2 grams rare earth carbonate (Molycorp 5230), 2.58 grams CuO, and 5.60 grams MnCO$_3$, and then calcining the material at 700° C. for 5 hours. X-ray diffraction indicated that a LaCu$_x$Mn$_{1-x}$O$_3$ perovskite phase had formed along with a small amount of Ce$_2$Nd$_2$O$_7$ contaminant phase.

4 grams of the LnCu$_{0.4}$Mn$_{0.6}$O$_3$ was then slurried into 170 ml of concentrated ammonium hydroxide in 340 ml of water using a high shear mixer, and a solution of 45.0 grams of magnesium nitrate hexahydrate and 131.8 grams of aluminum nitrate nonahydrate dissolved in 225 ml of water was added with continued mixing. The precipitate which formed was filtered and dried at 100° C. calcined at 700° C., and contained 16% by weight LnCu$_{0.4}$Mn$_{0.6}$O$_3$ MgAl$_2$O$_4$ spinel. The calcined product was ground and screened, and particles in the 45 to 150 μm size range were recovered for catalytic testing.

Preparation of Additive 4:

LnCu$_{0.4}$Mn$_{0.6}$O$_3$ was prepared in a manner analogous to Additive 3, except that the stoichiometry was corrected to account for the formation of Ce$_2$Nd$_2$O$_7$. 8.3 grams of this LnCu$_{0.4}$Mn$_{0.6}$O$_3$ was dispersed with 7.1 grams of a "light" grade of MgO into 125 ml of water using a high shear mixer. 18.0 grams (on a dry basis) of a peptizable alumina which had been peptized in a mixture of 200 ml of water and 4.1 ml of 88% formic acid was blended in using a high shear mixer. The resulting material, after being dried at 150° C., and calcined at 700° C., contained 25% by weight LnCu$_{0.4}$Mn$_{0.6}$O$_3$ in MgAl$_2$O$_4$ spinel. The calcined material was ground, and particles in the 45 to 150 μm size range were recovered for catalytic testing.

Preparation of Additive 5:

10 grams of Additive 4 was impregnated with 1.0 gram of copper sulfate pentahydrate dissolved in 3 ml of water to give additive 5 having 2.5% copper (on a metals weight basis).

Preparation of Additive 6:

25% LnCu$_{0.2}$Mn$_{0.8}$O$_3$ in spinel was prepared in a manner analogous to Additive 3 except that the stoichiometry of LnCu$_{0.2}$Mn$_{0.8}$O$_3$ was corrected to account for the formation of Ce$_2$Nd$_2$O$_7$.

Preparation of Additive 7:

10 grams of Additive 6 was impregnated with copper sulfate pentahydrate in a manner analogous to example Additive 5 to form 2.5% copper (on a metals basis) on 25% LnCu$_{0.2}$Mn$_{0.8}$O$_3$ in spinel.

Preparation of Additive 8:

25% LnCu$_{0.5}$Mn$_{0.5}$O$_3$ in spinel was prepared in a manner analogous to Additive 3 except that the stoichiometry of LnCu$_{0.5}$Mn$_{0.5}$O$_3$ was corrected to account for the formation of Ce$_2$Nd$_2$O$_7$.

Preparation of Additive 9:

LnCu$_{0.4}$Mn$_{0.6}$O$_3$ was again prepared in a manner analogous to that of Additive 4, except that a cerium free version of the rare earth carbonate (Molycorp 5231) was used. In a manner analogous to that of Additive 4, a peptizable alumina was gelled with formic acid and the appropriate quantity of magnesium oxide was added to the gel. The LnCu$_{0.4}$Mn$_{0.6}$O$_3$ and a USY zeolite (PQ 300-56) was slurried into water before being added to the gel. After drying at 350° C. and calcining at 700° C. for 1 hr, the material was ground and screened down to the 45 to 150 μm range to form 15% LnCu$_{0.4}$Mn$_{0.6}$O$_3$ /15% USY zeolite in MgAl$_2$O$_4$.

Example 2

Comparative additives were prepared as follows:
Preparation of Comparative Additive 10:

26.52 grams of La(NO$_3$)$_3$.6H$_2$O, 26.64 grams of Mn(NO$_3$)$_2$.6H$_2$O, and 7.12 grams Cu(NO$_3$)$_2$.2½H$_2$O were dissolved in 10 ml of water by warming the solution on a hot plate. This solution was then dripped onto 100 grams of calcined Alcoa C-30 alumina, which had been heated to 70° C. After drying, the material was calcined at 950° C. for 30 min. to form an additive with a hypothetical stoichiometry of 16% La$_{0.66}$Cu$_{0.33}$MnO$_3$ supported on alumina. X-ray diffraction revealed that the sample was multi-phased, and contained kappa alumina, a LaCu$_x$Mn$_{1-x}$O$_3$ perovskite, and a copper manganese spinel with a stoichiometry of approximately Cu$_{1.4}$Mn$_{1.6}$O$_4$.

Preparation of Comparative Additive 11:

Cu$_{1.4}$Mn$_{1.6}$O$_4$ prepared by grinding together the appropriate quantities of copper oxide and manganese carbonate in a ball mill, and then calcining the powder at 1100° C. for 10 hours.

Preparation of Comparative Additive 12:

A spinel support was prepared by dissolving 200 grams of magnesium nitrate hexahydrate and 585 grams of aluminum nitrate nonahydrate in 1000 ml water, and adding this solution to a second solution of 750 ml of concentrated ammonium hydroxide in 1500 ml water. The precipitate was then filtered, washed, dried, and calcined at 700° C. for 1 hr. The calcined product was then ground and screened, and particles in the 45 to 150 μm range recovered. The spinel had a surface area of 128 M$^2$/gm and a pore volume of 0.299 cc/gm.

A perovskite with a hypothetical stoichiometry of 16% La$_{0.66}$Cu$_{0.33}$MnO$_3$ on spinel was prepared by impregnating the spinel support with the appropriate quantities of the corresponding metal salts, and then calcining the material at 950° C. for 30 min. X-ray diffraction indicated the presence of poorly crystalline magnesium aluminum spinel along with a LaCu$_x$Mn$_{1-x}$O$_3$ perovskite type phase. The presence of the copper manganese spinel could not be ascertained because of the overlap of its peaks with the magnesium aluminum spinel.

Example 3

The activities of the above additives of this invention and comparative additives were determined by measuring the percent NOx reduction of a 130 ppm NO/490 ppm CO in nitrogen stream as it fluidized a 40 gram bed of unpromoted equilibrium catalyst containing 0.10 grams of the additive being tested. The equilibrium catalyst containing the additive was then aged a predetermined number of cycles in a fluidized bed reactor that was designed to simulate the FCC process. This aging unit was programmed to add a West Texas sour vacuum gas oil containing 1.02% S over a two minute period to the fluidized bed at 1000° F. On a total weight basis the catalyst to oil ratio equaled 11. The equilibrium catalyst containing the NOx additive was then stripped at 1000° F. with a mixture of 90% steam/10% nitrogen for three minutes, followed by a regeneration step using air containing 10% steam at 1300° F. for 5 minutes. The total cycle time was 14 minutes. Following a predetermined number of cycles, the catalyst was then placed back in the NO tester to determine its new activity. The results are shown in Table I.

The following observations can be drawn from the results shown in Table I. Additives containing oxides having perovskite structures and oxides having spinel structures have better long-term activity than do those additives having perovskite structures in combination with non-spinel oxides such as alumina. Adding copper to the perovskite/spinel oxides further improves the long-term activity. Conversely, preparing the perovskite with excess transition metal, as in Additive 12, causes undesirable phases to form, which results in decreased long-term activity of the additive.

There are numerous variations on the above examples which are possible in light of the teachings supporting the present invention. It is therefore understood that within the scope of the following claims, the invention may be practiced otherwise than as specifically described or exemplified herein.

TABLE I

| Additive | % NO Reduction | | |
|---|---|---|---|
| | Fresh Additive Activity | Aged Additive | |
| | | No. of Cycles | Activity |
| Additives of this Invention | | | |
| 1 | 46 | 46 | 76 |
| | | 160 | 35 |
| 2 | 28 | 200 | 31 |
| 3 | 49 | 200 | 23 |
| | | 400 | 17 |
| 4 | 48 | 140 | 33 |
| 5 | 50 | 200 | 64 |
| | | 300 | 50 |
| 6 | 64 | 200 | 10 |
| 7 | 69 | 185 | 71 |
| 8 | 40 | 200 | 12 |
| 9 | 34 | 187 | 29 |
| Comparative Additives | | | |
| 11 | 0 | | |
| 10 | 43 | 50 | 5 |
| 12 | 60 | 45 | 4 |

What is claimed is:

1. A process for reducing the NOx content of an FCC regenerator flue gas comprising contacting said flue gas at FCC regeneration conditions with an effective amount of an NOx reducing additive comprising:

(a) a copper-contaiing perovskite having the general formula LnCu$_x$Mn$_{1-x}$O$_3$, wherein "Ln" represents at least one element selected from the group consisting of lanthanum, cerium, neodymium, and praseodymium, and wherein "x" has a value of at most about 0.6;

(b) a spinel containing at least one Group IIA element and at least one Group IIIA element; and (c) at most about 10 weight percent of a stabilization component distinct from the perovskite and the spinel and comprising an element or compound thereof selected from the group consisting of copper, zinc and mixtures thereof.

2. The process according to claim 1 wherein the additive contains from about 1 to about 40 percent by weight of the perovskite.

3. The process according to claim 2 wherein the additive contains from about 5 to about 35 percent by weight of the perovskite.

4. The process according to claim 1 wherein the spinel is a magnesia alumina spinel.

5. The process according to claim 1 wherein the additive contains between about 0.1 and about 5 weight percent of the stabilization component.

6. The process according to claim 1 wherein the additive further comprises a cracking component.

7. The process according to claim 6 wherein the cracking component is selected from the group consisting of zeolite Y, rare earth exchanged zeolite Y, ultrastable zeolite Y, calcium-exchanged zeolite Y, ZSM-5, acid exchanged clay, and amorphous aluminosilicate.

8. The process according to claim 7 wherein the cracking component is zeolite Y.

9. The process according to claim 6 wherein the additive comprises at most about 40 weight percent of the cracking component.

10. The process according to claim 9 wherein the additive contains at most about 25 weight percent of the cracking component.

11. A process for reducing the NOx content of FCC regenerator flue gas, said process comprising cracking hydrocarbons in the absence of externally supplied molecular hydrogen in a cracking system employing an inventory of circulating particulate solids including cracking catalyst particles, said inventory being cycled between a cracking zone and a catalyst regeneration zone, wherein said hydrocarbons are cracked in contact with said catalyst particles and coke is formed on said catalyst particles at cracking conditions in said cracking zone, and flue gas is formed by burning said coke oil said catalyst particles with oxygen or a molecular oxygen-containing gas at regeneration conditions in said regeneration zone, and said flue gas is vented from said regeneration zone, wherein said process comprises adding to said inventory of circulating particulate solids an effective amount of an NOx reducing additive comprising:

(a) from about 10 to about 30 weight percent of a copper-containing perovskite having the general formula $LnCu_xMn_{1-x}O_3$, where "Ln" represents at least one element selected from the group consisting of lanthanum, cerium, neodymium, and praseodymium, and wherein "x" has a value of at most about 0.6;

(b) from about 0.5 to about 5 weight percent of a stabilization component distinct from the perovskite and the spinel and comprising an element or compound thereof selected from the group consisting of copper, zinc and mixtures thereof; and (c) a magnesia alumina spinal to make 100 weight percent.

12. The process according to claim 11 wherein the additive further comprises a cracking component.

13. The process according to claim 12 wherein the additive further comprises at most about 40 weight percent of the cracking component.

14. The process according to claim 12 wherein the cracking component is selected from the group consisting of zeolite Y, rare earth exchanged zeolite Y, ultrastable zeolite Y, calcium-exchanged zeolite Y, ZSM-5, acid exchanged clay, and amorphous aluminosilicate.

15. The process according to claim 11 wherein said inventory of circulating particulate solids contains from about 0.001 to about 10 weight percent of the NOx reduction additive, on a cracking component free basis.

16. The process according to claim 11 wherein said vented regenerator flue gas contains less than about 5000 ppmv NOx.

17. The process according to claim 11 wherein said vented regenerator flue gas contains less than about 500 ppmv NOx.

18. The process according to claim 11 wherein said vented regenerator flue gas contains at most about 5 percent by volume molecular oxygen.

19. The process according to claim 11 wherein said vented regenerator flue gas contains from about 50 ppmv to about 5000 ppmv of sulfur oxides.

20. An NOx reduction additive comprising:

(a) from about 1 to about 40 weight percent of a copper-containing perovskite having the general formula $LnCu_xMn_{1-x}O_3$, where "Ln" represents at least one element selected from the group consisting of lanthanum, cerium, neodymium, and praseodymium, and wherein "x" has a value of at most about 0.6;

(b) at most about 10 weight percent of a stabilization component distinct from the perovskite and the spinel and comprising an element or compound thereof selected from the group consisting of copper, zinc and mixtures thereof; and (c) a magnesia alumina spinel to make 100 weight percent.

21. The composition according to claim 20 wherein the additive contains from about 5 to about 35 weight percent of the perovskite.

22. The composition according to claim 20 wherein the additive contains from about 10 to about 30 weight percent of the perovskite.

23. The composition according to claim 20 wherein the additive further comprises a cracking component.

24. The composition according to claim 23 wherein the additive further comprises at most about 40 weight percent of the cracking component.

25. The composition according to claim 23 wherein the additive comprises at most about 25 weight percent of the cracking component.

26. The composition according to claim 23 wherein the cracking component is selected from the group consisting of zeolite Y, rare earth exchanged zeolite Y, ultrastable zeolite Y, calcium-exchanged zeolite Y, ZSM-5, acid exchanged clay, and amorphous aluminosilicate.

27. The composition according to claim 26 wherein the cracking component is zeolite Y.

28. A cracking catalyst composition comprising a particulate cracking catalyst and from about 0.001 to about 10 weight percent, on a cracking component free basis, of an NOx reduction additive, said additive comprising:

(a) from about 1 to about 40 weight percent of a copper-containing perovskite having the general formula $LnCu_xMn_{1-x}O_3$, where "Ln" represents at least one element selected from the group consisting of lanthanum, cerium, neodymium, and praseodymium, and wherein "x" has a value of at most about 0.6;

(b) at most about 10 weight percent of a stabilization component distinct from the perovskite and the spinel and comprising an element or compound thereof selected from the group consisting of copper, zinc and mixtures thereof; and (c) a magnesia alumina spine 1 to make 100 weight percent.

29. The composition according to claim 28 wherein said additive further comprises at most about 40 weight percent of a cracking component.

30. The composition according to claim 28 wherein the cracking catalyst composition contains from about 0.01 to about 5 percent by weight of the additive.

* * * * *